May 14, 1929.                J. F. FERGUSON                1,712,606
                             COTTON HARVESTER
                          Filed Feb. 27, 1928        3 Sheets-Sheet  1
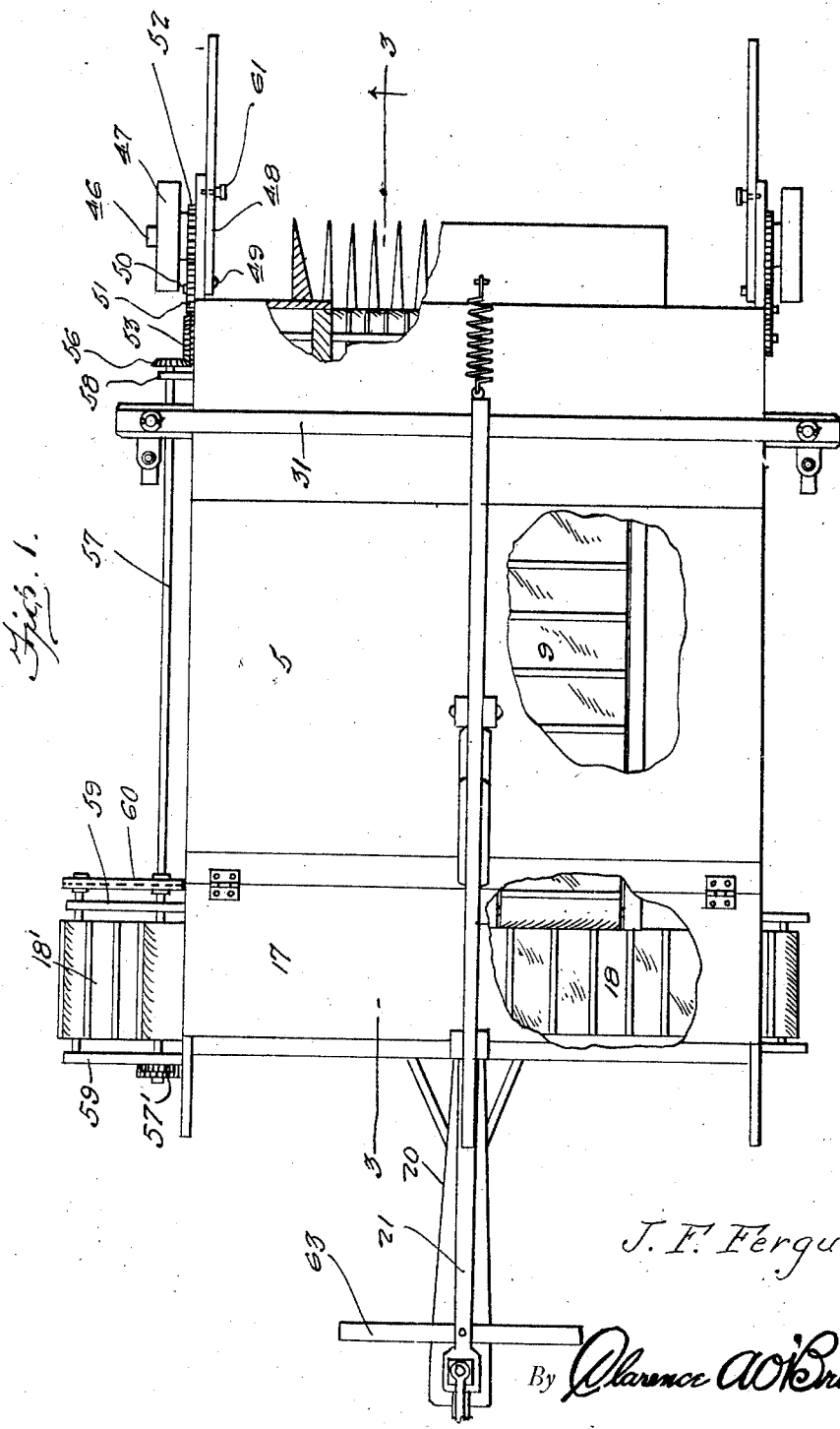

May 14, 1929.  J. F. FERGUSON  1,712,606
COTTON HARVESTER
Filed Feb. 27, 1928   3 Sheets-Sheet 2
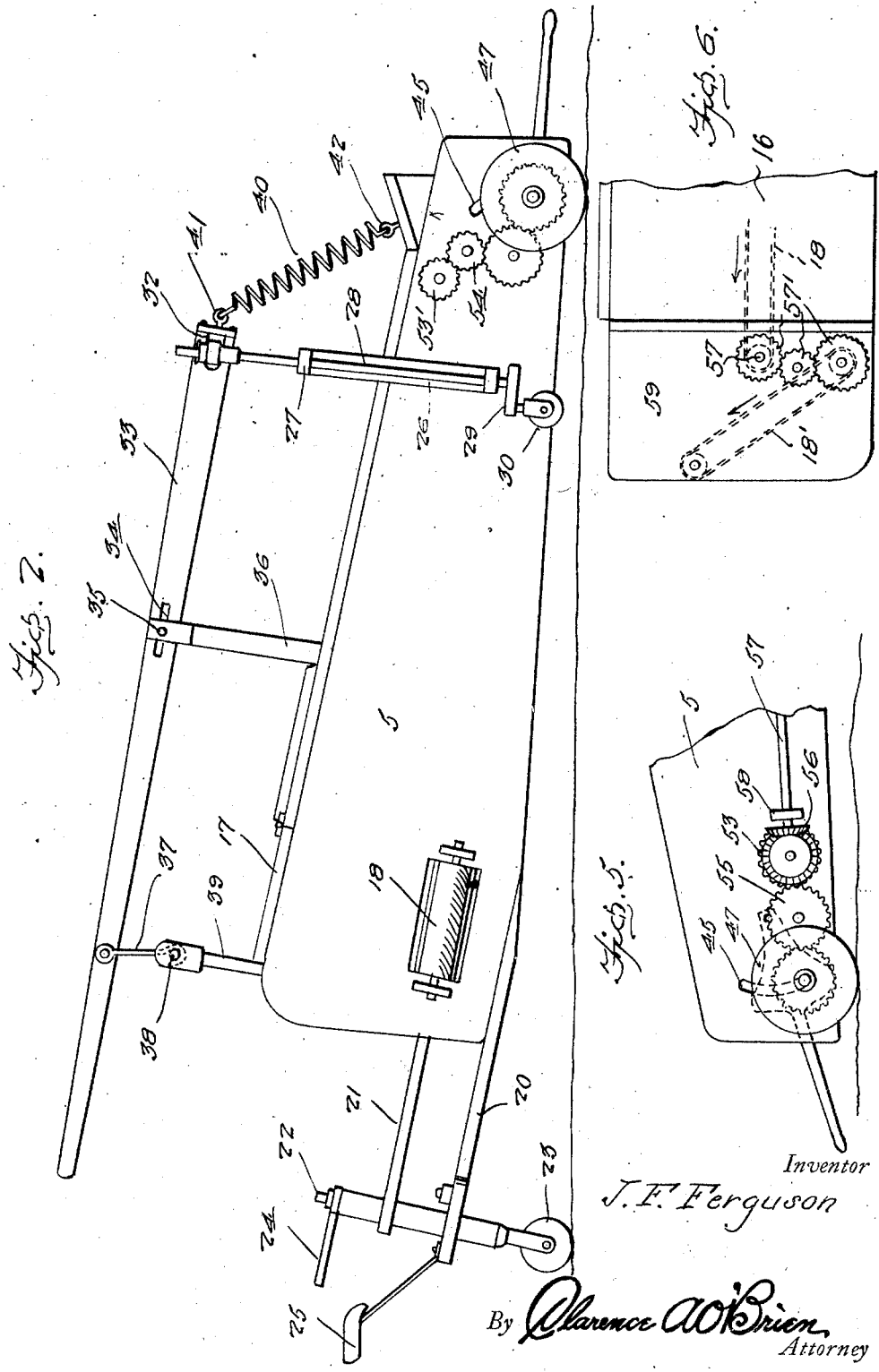
Inventor
J. F. Ferguson
By Clarence A. O'Brien
Attorney

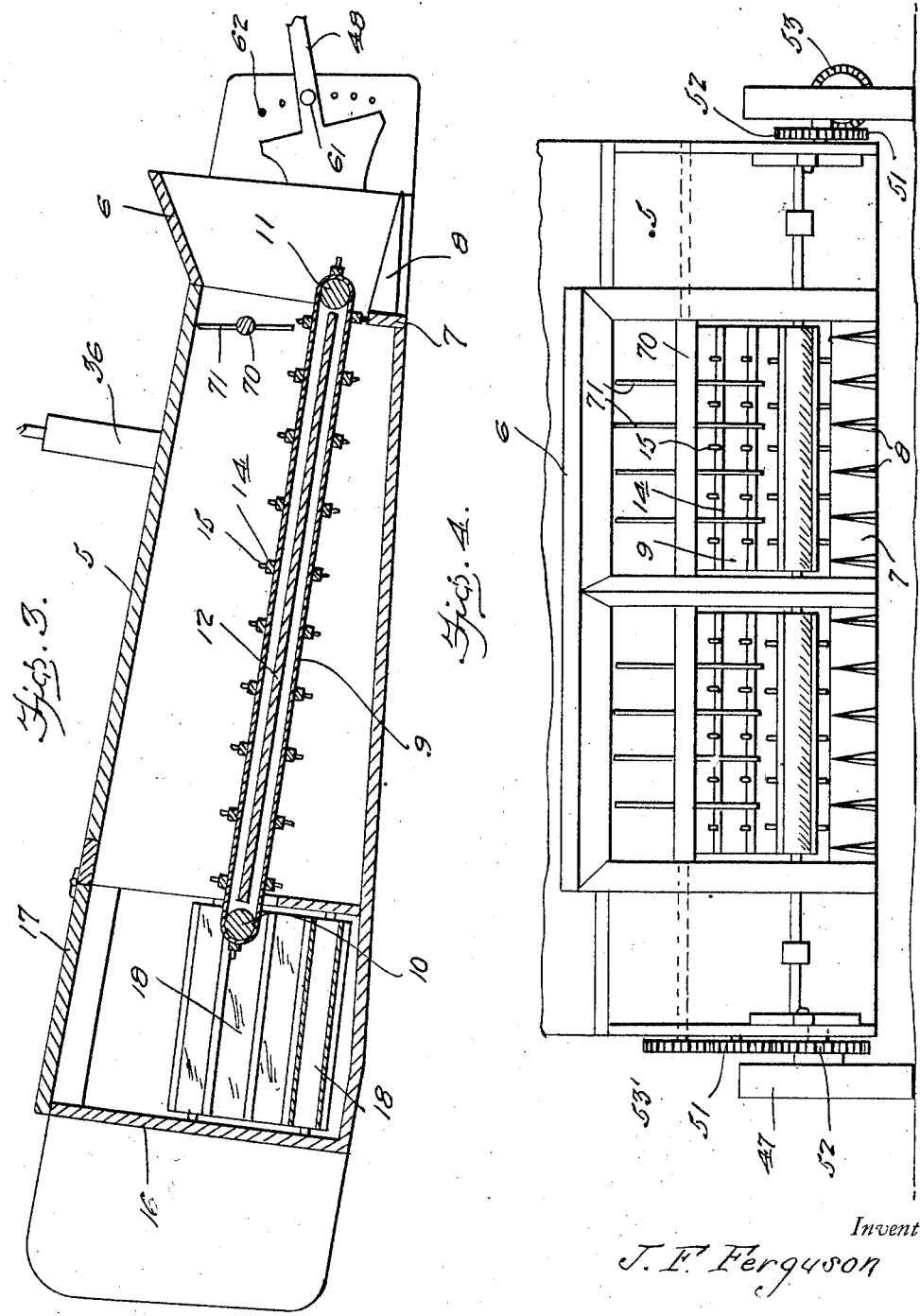

Patented May 14, 1929.

1,712,606

UNITED STATES PATENT OFFICE.

JAMES F. FERGUSON, OF GRANDFIELD, OKLAHOMA.

COTTON HARVESTER.

Application filed February 27, 1928. Serial No. 257,309.

The present invention relates to a cotton harvester and has for its prime object to provide a machine which will strip the cotton from the plant and deliver the same rearwardly of the machine and then transversely so that the cotton may be deposited in a wagon or the like.

Another very important object of the invention resides in the provision of a cotton harvester of this nature which may be adjusted to an operative or inoperative position in an easy and expeditious manner.

A still further very important object of the invention resides in the provision of a harvester of this nature which is simple in its construction, strong and durable, thoroughly efficient and reliable in its operation, and otherwise well adapted to the purpose for which it is designed.

With the above and numerous other objects in view as will appear as the description proceeds, the invention resides in certain novel features of construction, and in the combination and arragement of parts as will be hereinafter more fully described and claimed.

In the drawings:—

Figure 1 is a top plan view of the cotton harvester embodying the features of my invention showing portions thereof broken away and in section, Figure 2 is a side elevation thereof, Figure 3 is a longitudinal vertical section therethrough taken substantially on the line 3—3 of Figure 1, Figure 4 is a fragmentary front elevation thereof, Figure 5 is a fragmentary side elevation showing the forward portion of the harvester, Figure 6 is a fragmentary rear elevation thereof.

Referring to the drawing in detail it will be seen that the numeral 5 denotes a casing which is provided at its front end with a flared entrance 6. A bar 7 extends across the bottom of the entrance and has teeth 8 projecting forwardly therefrom to strip the cotton from the plant as the machine moves forwardly. An endless conveyor belt 9 is mounted on rollers 10 and 11 journaled in the casing. This endless conveyor belt is disposed about a supporting shelf 12 and has on the outside thereof a plurality of cross cleats 14 provided with teeth 15. The sides of the casing are extended rearwardly and have a cross backplate 16 a distance forwardly of their rear edges. The bottom also of the casing continues backwardly to the plate 16. The top of the casing however, has hinged thereto a cover or lid 17. In the rear portion of the casing there is mounted an endless conveyor belt 18 which extends transversely across the casing horizontally and is disposed below the conveyor 9 so as to catch the cotton and convey it to the endless loader conveyor 18'. The loading conveyor 18' has its inner end below the outer end of conveyor 18, is mounted laterally of the casing and inclines upwardly from its inner to its outer end, thereby elevating the cotton to the height of a wagon in which the cotton is to be discharged.

Bars 20 and 21 extend rearwardly from the casing and have journaled therein a shaft 22 the lower end of which has journaled thereon a wheel 23. A lever 24 is provided on the shaft so that the wheel 23 may be steered. At the rear end of the bar 20 there is mounted a seat 25.

Brackets 26 are mounted on the sides of the casing adjacent the forward end thereof and have laterally extending ears 27 through which are slidable shafts 28 having off-set lower extremities 29 in which are mounted castors 30. The upper ends of the shafts 28 are engaged with a cross-bar 31 which is projected through a slot 32 of a lever 33. This lever 33 is provided intermediate its ends with a slot 34 to receive pin 35 from a bracket 36 rising from the casing. Adjacent the rear end of the lever there is mounted a hook 37 which may be engaged with a pin 38 on the bracket 39 rising from the rear of the casing or from the plate 16. A spring 40 is engaged as at 41 with the forward end of the lever 33 and with the top of the flared entrance as at 42. This spring tends to hold the castors 30 in engagement with the ground so that the forward end of machine is elevated, that is in its inoperative position. When the machine is to be disposed in its operative position the rear end of the lever is pulled downwardly and the hook 37 is engaged with the pin 38 as is clearly shown in Figure 2 of the drawing.

The sides of the casing are extended forwardly as is clearly shown in Figure 1 and have slots 45 therein of arcuate formation in which are movable stub axles 46 with wheels 47 journaled thereon. These stub axles extend from levers 48 which are pivotally mounted as at 49 on the same axis with shaft 50 on which are rotatably mounted gears 51. The gears 51 are in mesh with the gears 52 rotatable with the wheels 47. Gears 53 are operatively connected with the roller 11 and in mesh with idler gears 54 which are also in mesh with gears 51. One of the gears 53 has bevelled portions in mesh with a bevel pinion 56 on a shaft 57 journaled in a bracket 58 and through a pair of spaced plates 59 which extend laterally from the rear portion of the casing one to each side of the transverse endless conveyors 18, 18'. One end of the endless conveyor 18 is journaled to the rear portion of the shaft 57 which imparts the power thereto and at the rear end of the shaft 57, by a suitable train of gears 57', power is taken from the shaft 57 to the inner end of the loading conveyors 18'. A sprocketed chain drive connection 60 is provided between the shaft 57 and the outer end of the endless conveyor 18'.

It will thus be seen that when the wheels 47 are in engagement with the ground and the conveyors 9, 18 and 18' are in operation the cotton is directed rearwardly and then transversely out of the rear left side of the machine to be deposited in a wagon or the like. The height of the teeth 8 from the ground may be regulated by manipulating the levers 48 and in order to hold these levers 48 in different adjusted positions pins 61 are provided which may be engaged in the series of openings 62.

A beater shaft 70 is journaled across the forward end of the casing and has teeth 71 radiating therefrom. This shaft 70 is driven by gear 53'. The rotating beater thus formed beats the cotton rearwardly in the casing and down on the front end of the conveyor 9.

It is thought that the construction, operation, and advantages of the invention will now be clearly understood without a more detailed description thereof. If desired an equalizer 63 may be mounted on the bar 20 so that a team or teams of draft animals may be used to push the machine. It is apparent, of course, that other draft means may be utilized. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A cotton harvester of the class described comprising a casing, wheel means at the rear end of the casing, wheel means at the forward ends of the casing, a pair of brackets one on each side of the forward portion of the casing, shafts slidable in the brackets, castor wheels on the lower ends of the shafts, a bar connecting the upper ends of the shafts, a lever, means for pivoting the lever intermediate its ends, means for connecting the forward end of the lever with the bar.

2. A cotton harvester of the class described comprising a casing, wheel means at the rear end of the casing, wheel means at the forward ends of the casing, a pair of brackets one on each side of the forward portion of the casing, shafts slidable in the brackets, castor wheels on the lower ends of the shafts, a bar connecting the upper ends of the shafts, a lever, means for pivoting the lever intermediate its ends, means for connecting the forward end of the lever with the bar, spring means associated with the forward end of the lever for urging the same normally downwardly.

3. A cotton harvester of the class described comprising a casing, wheel means at the rear end of the casing, wheel means at the forward ends of the casing, a pair of brackets one on each side of the forward portion of the casing, shafts slidable in the brackets, castor wheels on the lower ends of the shafts, a bar connecting the upper ends of the shafts, a lever, means for pivoting the lever intermediate its ends, means for connecting the forward end of the lever with the bar, spring means associated with the forward end of the lever for urging the same normally downwardly, a hook engaged with the rear end of the lever, and means on the casing with which the hook may be engaged to hold the rear end of the lever downwardly.

4. A cotton harvester of the class described comprising an elongated casing, a plurality of teeth projecting forwardly from the casing, conveying means in the casing, a bar extending rearwardly from the casing, a shaft journaled in the rear end of the bar, a wheel on the lower end of the shaft, means for turning the shaft, wheels at the front of the casing, means connecting the front wheels with the conveyor mechanism whereby the conveyor mechanism will be operated as the machine moves forwardly, a bracket rising from the casing, a lever pivoted intermediate its ends on the bracket, a cross bar at the forward end of the lever, shafts engaged on the extremities of the cross bar, brackets on the sides of the machine for slidably receiving the shafts, and castors mounted at the bottom ends of the shaft.

5. A cotton harvester of the class described comprising an elongated casing, a plurality of teeth projecting forwardly from the casing, conveying means in the casing, a bar extending rearwardly from the casing, a shaft journaled in the rear end of the bar, a wheel on the lower end of the shaft, means for turning the shaft, wheels at the front of the casing, means connecting the front wheels with the conveyor mechanism whereby the conveyor mechanism will be operated as the machine moves forwardly, a bracket rising from the casing, a lever pivoted intermediate its ends on the bracket, a cross bar at the forward end of the lever, shafts engaged on the extremities of the cross bar, brackets on the sides of the machine for slidably receiving the shafts, and castors mounted at the bottom ends of the shafts, a spring engaged with the forward end of the lever normally holding the same downwardly.

6. A cotton harvester of the class described comprising an elongated casing, a plurality of teeth projecting forwardly from the casing, conveying means in the casing, a bar extending rearwardly from the casing, a shaft journaled in the rear end of the bar, a wheel on the lower end of the shaft, means for turning the shaft, wheels at the front of the casing, means connecting the front wheels with the conveyor mechanism whereby the conveyor mechanism will be operated as the machine moves forwardly, a bracket rising from the casing, a lever pivoted intermediate its ends on the bracket, a cross bar at the forward end of the lever, shafts engaged on the extremities of the cross bar, brackets on the sides of the machine for slidably receiving the shafts, and castors mounted at the bottom ends of the shafts, a spring engaged with the forward end of the lever normally holding the same downwardly, means at the rear end of the lever for holding the same downwardly with the spring under tension.

In testimony whereof I affix my signature.

JAMES F. FERGUSON.